Figure 1:
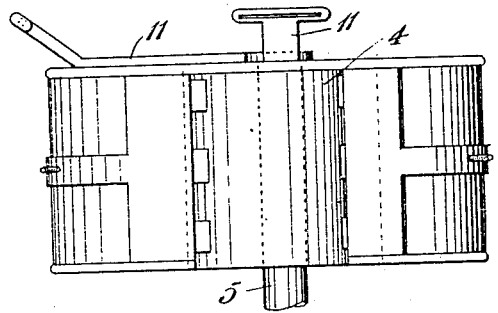

No. 874,972. PATENTED DEC. 31, 1907.
A., H. LOQVIST.
MILKING MACHINE.
APPLICATION FILED AUG. 3, 1906.

4 SHEETS—SHEET 1.

Witnesses
Karl Runeskog
Sten Ericsson

Inventor
August H. Loqvist

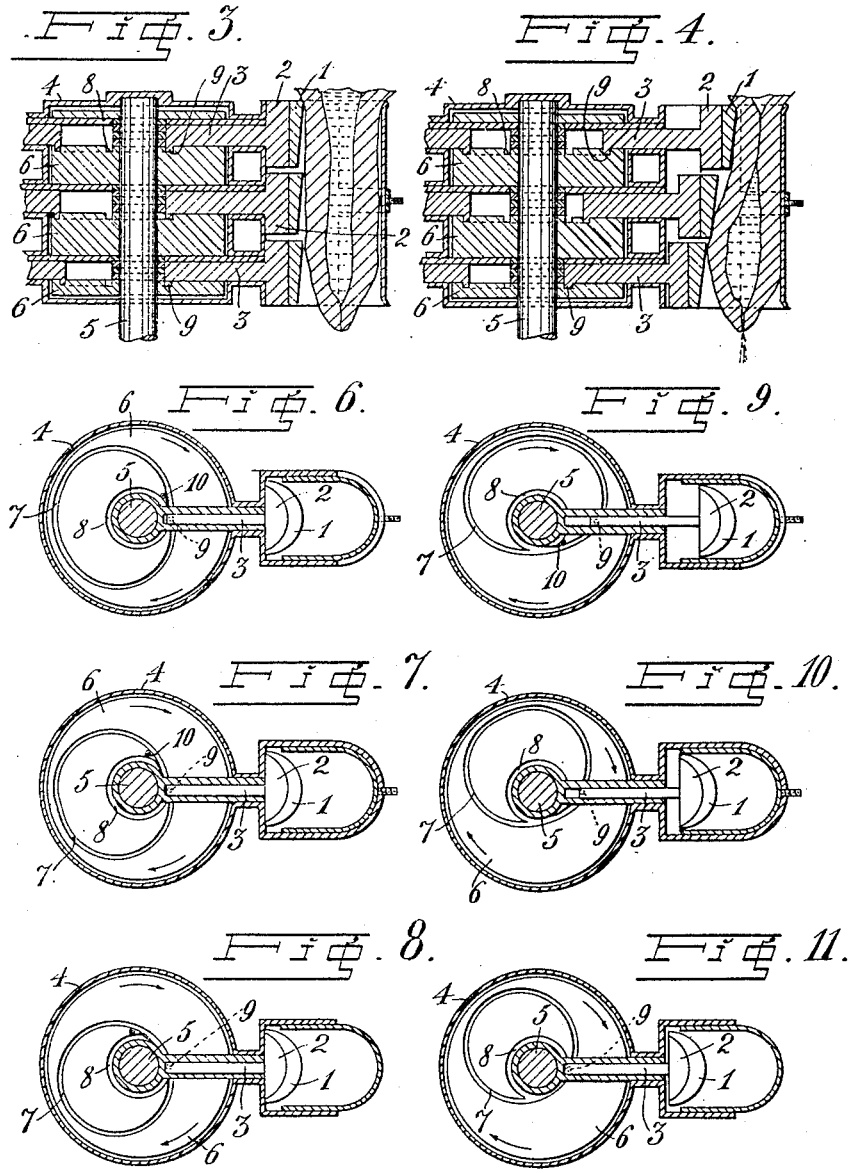

No. 874,972. PATENTED DEC. 31, 1907.
A. H. LOQVIST.
MILKING MACHINE.
APPLICATION FILED AUG. 3, 1906.
4 SHEETS—SHEET 3.
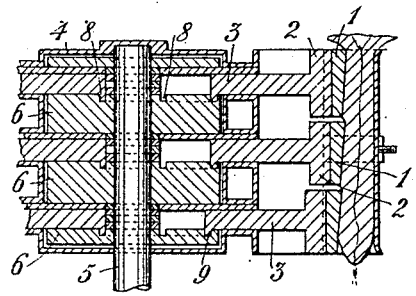
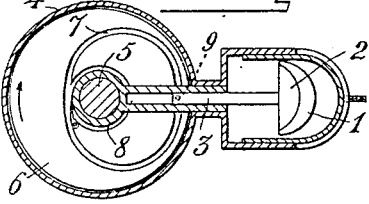
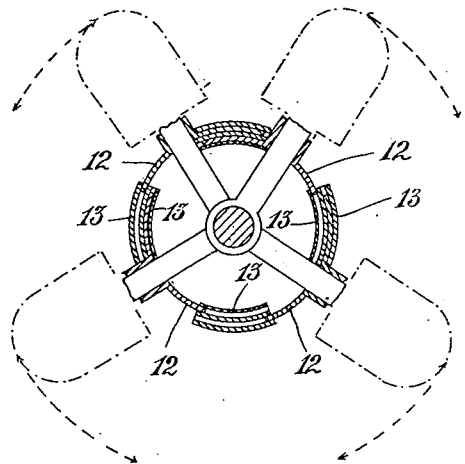
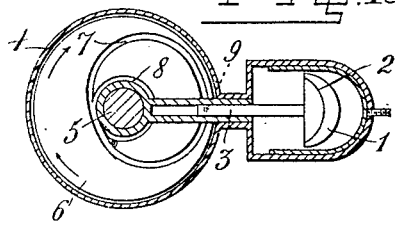
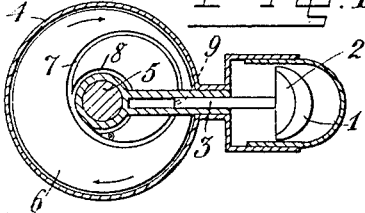
Witnesses
Karl Runeskog
Sten Ericsson
Inventor
August H. Loqvist
by Oopdall
Atty

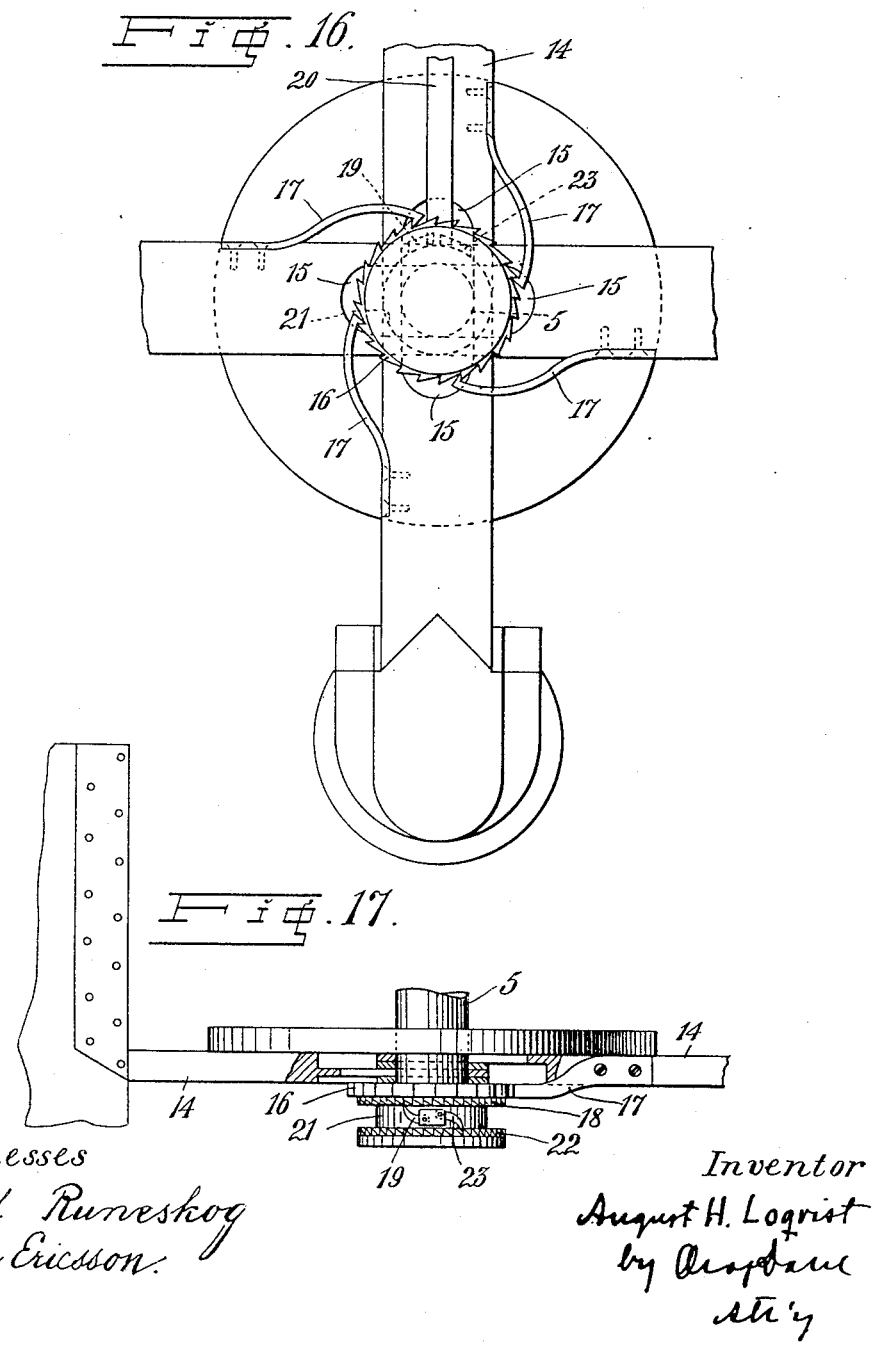

UNITED STATES PATENT OFFICE.

AUGUST HJALMAR LOQVIST, OF SÖDERKÖPING, SWEDEN.

MILKING-MACHINE.

No. 874,972.  Specification of Letters Patent.  Patented Dec. 31, 1907.

Application filed August 3, 1906. Serial No. 328,993.

*To all whom it may concern:*

Be it known that I, AUGUST HJALMAR LOQVIST, a subject of the King of Sweden, and resident of Söderköping, Sweden, have invented new and useful Improvements in Milking-Machines, of which the following is a specification, reference being had to the drawing accompanying and forming a part hereof.

This invention relates to milking-machines of the type in which each separate milking device is provided with a set of pistons or plungers adapted to be placed up to one of the teats for extracting the milk from the udder, said pistons, when actuated, acting successively upon the said teat from the root thereof toward its extremity so as to imitate the action of the fingers in common handmilking.

The object of the invention is to so arrange the driving means as to make it possible to easily move all the pistons into their innermost positions thereby enabling the machine to be more conveniently than otherwise placed in its working position or to be taken off from the teats, after milking.

A further object of the invention is to provide means for adjusting the milking organs to different udders.

The invention, briefly, consists in a special driving means for the pistons, said driving means consisting of a rotatable driving shaft carrying a number of disks or cams, one for each piston, each disk or cam being provided with two slots, cam grooves, or the like, one of which is eccentric to the driving shaft while the other is concentric to the said shaft, means being provided for causing the pistons to engage the eccentric cam groove, when the driving shaft is rotated in one direction for working, and to cause the said pistons to engage the concentric slot when the driving shaft is rotated in the opposite direction for drawing the pistons into their innermost positions.

The invention further comprises the constructions hereinafter specifically described and pointed out in the claims.

Figure 2:
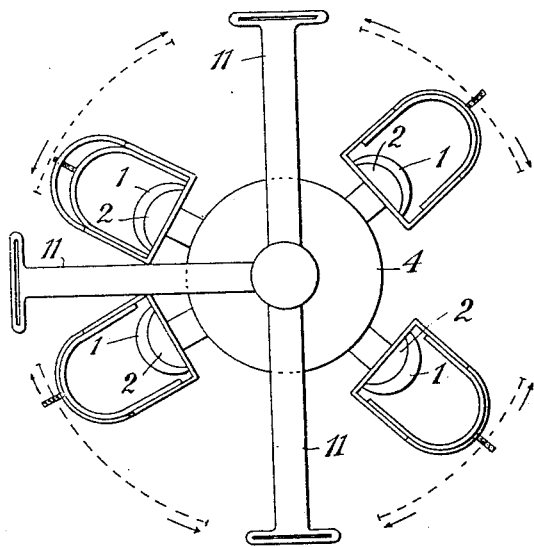

Referring to the drawings, Figure 1 shows a side-elevation of a suitable form of the milking machine according to the present invention; Fig. 2 is a top plan-view of the machine; Figs. 3, 4 and 5 are vertical sections of the machine, the pistons being shown in different positions; Figs. 6, 7 and 8 show the different positions of the pistons according to Fig. 3; Figs. 9, 10 and 11 show, in the same manner, the different positions of the pistons according to Fig. 4; Figs. 12, 13 and 14 show, in the same manner, the different positions of the pistons according to Fig. 5; Fig. 15 shows a horizontal section of part of the arrangement for adjusting the milking organs to different udders; Fig. 16 shows another part of the same arrangement placed at the underside of the apparatus, and Fig. 17 shows a side-view of the last-mentioned partly in vertical section.

The pistons 2 coated with rubber pads 1 in any suitable manner extend with their piston rods 3 through the wall of a cylindric casing 4 inclosing the driving means. Journaled in the said casing is a vertical shaft 5 having attached to it three slotted disks or cams 6, one for each piston rod 3. The slots 7, 8 of the cams are suitably arranged at the upper side of the said cams. Projecting into the slots are lugs 9 suitably located at the inner ends of the piston rods 3, said lugs being suitably provided with antifriction rollers. As illustrated in the drawings, the slots 7 are eccentric, thereby causing the pistons and piston rods to move outward and inward whereas the slots 8 are concentric with the driving shaft 5. The rotation of the shaft 5, or of the slotted disks or cams, during working, takes place in the direction of the arrows indicated in the drawing. The lugs 9 are thereunder prevented from entering the slots 8 thereby that a tongue 10 is pivotally mounted, in the manner shown in the drawings, in one of the corners where the slots 8 and 7 pass into each other, said tongue being springy in such a manner as to cut off, during the said rotating movement, the inlet to the slot 8. When the machine is to be removed from the teats, or applied thereto, the shaft with the disks is turned in the direction opposite to that indicated by the arrows, the lugs 9 then entering the slots 8 through the open ends thereof, whereby all the pistons 2 are drawn inwardly to their innermost positions, as illustrated in Fig. 3 so that the machine may in a convenient manner be taken off the teats, or applied thereto as the case may be.

The shaft 5 receives motion from any suitable transmission device, such as for instance a flexible shaft or the like, and the machine is hung in working position by means of straps placed over the rump of the cow and extending from arms 11 at the upper side of the machine.

The milking organs located outside the cylindric casing 4 are connected to the casing, for the purpose of allowing adjustment according to different udders, in such a manner as to be able to be swung in a direction toward or away from one another. To this end, the milking organs are provided with extensions 12 suitably in the shape of cylindric walls entering corresponding guides suitably consisting of recesses between walls 13, or the like, constituting parts of, or connected in any suitable manner to the cylindric casing 4, so that the milking organs can be swung away from and toward one another within certain limits and thus be adjusted to different udders.

The arrangement shown in Figs. 16 and 17 not only realizes the hereinbefore described swinging motion of the milking organs but also their adjustment in radial directions. The four milking organs, one of which is shown in the drawing, are carried each by one arm 14. All these arms are adapted not only to turn with their inner ends about the common shaft but also to move in a radial direction in relation to the said shaft, which passes through an oblong slot 15 in each of the said arms. Mounted loosely on the shaft 5 is a ratchet-wheel 16 engaging four spring pawls 17, each attached to one of the arms 14 in the manner indicated in the drawing. The ratchet-wheel 16 is made integral with a ratchet-wheel 18 engaged by a spring pawl 19 pivotally attached to the lever 20, said lever being adapted to be turned about the shaft 5 in that the lever extends from a collar 21 loosely mounted on the said shaft. Fixed to the lower end of the shaft 5 is a ratchet-wheel 22, engaged by a pawl 23 likewise pivotally attached to the lever. The pawl 23 is connected to a suitable releasing device for the pawl, said releasing device being, however, not shown in the drawing.

The described arrangement works in the following manner. If the milking organs are to be drawn inwardly from the position shown in Fig. 16 i. e. if they are to be placed at shorter distances from one another, the lever 20 is swung to the side, so that the pawl 19 turns the wheels 18 and 19. The spring pawls 17 gripping in the latter then act to draw the arms 14, and thereby the milking organs, inwardly in radial directions. The outward movement of the milking organs is prevented by the pawl 23 which, by its engagement with the fixed ratchet-wheel 22, prevents the lever 20 from swinging backwards. If, on the other hand, the pawl 23 is released, the milking organs can be brought outwardly as far as required.

Having now described my invention what I claim as new and desire to secure by Letters Patent is:

1. In a milking-machine, the combination with pistons adapted to be placed up to the teats to successively act upon the same from the roots thereof toward their extremities, of a driving shaft, a number of disks carried by the said driving shaft, each disk having two slots communicating with each other, one slot being eccentric and the other concentric to the driving shaft, lugs projecting from the pistons into the slots, and means for causing the said lugs to engage the eccentric slot, when the driving shaft is rotated in one direction, and for causing the said lugs to engage the concentric slot, when the shaft is rotated in the opposite direction, substantially as and for the purpose set forth.

2. In a milking-machine, the combination with pistons adapted to be placed up to the teats to successively act upon the same from the roots thereof toward their extremities, of a casing having holes through which the pistons project, a driving shaft journaled within the said casing, a number of disks attached to the said shaft, each disk having an eccentric slot as also a second slot concentric with the driving shaft, said latter slot communicating, at its ends, with the eccentric slot, lugs projecting from the pistons into the slots of the disks, and tongues placed at one end of the concentric slots adjacent to the eccentric slot, said tongues being adapted to cause the lugs to engage the eccentric slot when the machine is working, substantially as and for the purpose set forth.

3. In a milking-machine, the combination of a frame, teat-cups mounted in the said frame in such a manner as to be able to swing away from and toward one another, pistons extending through the walls of the teat-cups to successively act upon the teats, and a number of slotted disks connected to the pistons in such a manner as to cause the pistons to successively move, substantially as and for the purpose set forth.

4. In a milking-machine, the combination of a frame, a shaft mounted in the said frame, arms loosely mounted on the shaft, said arms having oblong holes allowing them to be also moved at right angles to the said shaft, means for keeping the arms in position, milking organs carried by the arms, pistons movably mounted in the milking organs, and disks connected to the pistons in such a manner as to cause the latter to successively move, substantially as and for the purpose set forth.

5. In a milking-machine, the combination of a frame, a shaft mounted in the said frame, arms having oblong holes embracing the shaft so as to allow the said arms to be moved at right angles to the shaft, a ratchet-wheel loosely mounted on the shaft, pawls attached to the arms, a lever journaled about the shaft, a pawl carried by the said lever, the different pawls engaging the ratchet-wheel in such a manner, that, when the lever is turned, the arms are caused to move inwardly, milking organs carried by the arms, pistons mounted to move in the milking organs, and disks connected to the pistons in such a manner as to cause the latter to successively move, substantially as and for the purpose set forth.

6. In a milking-machine, the combination of a frame, a shaft mounted in the said frame, arms having oblong holes embracing the shaft so as to allow the said arms to be moved at right angles to the shaft, milking organs carried by the arms, pistons mounted to move in the milking organs, disks connected to the pistons in such a manner as to cause the latter to successively move, a ratchet-wheel loosely mounted on the shaft, pawls attached to the arms, a lever journaled about the shaft, a pawl carried by the said lever, the different pawls engaging the ratchet-wheel in such a manner that, when the lever is turned about the shaft, the arms are caused to move inwardly, a ratchet-wheel fixed to the shaft, a second pawl attached to the lever, said pawl engaging the fixed ratchet-wheel to prevent the lever from being turned backward, and means for releasing the said pawl, substantially as and for the purpose set forth.

In testimony whereof I have signed my name to this specification in the presence of two subscribing witnesses.

AUGUST HJALMAR LOQVIST.

Witnesses:
ELLEN LOVÉN,
STEN ERICSSON.